United States Patent
Wang

(10) Patent No.: US 10,301,548 B2
(45) Date of Patent: May 28, 2019

(54) PHOSPHORUS-NITROGEN-BASED INTUMESCENT FLAME RETARDANT AND SYNTHETIC METHOD AND USE THEREOF

(71) Applicant: Institute of Advanced Technology, University of Science and Technology of China, Anhui (CN)

(72) Inventor: Zhiyong Wang, Anhui (CN)

(73) Assignee: Institute of Advanced Technology, University of Science and Technology of China, Anhui (CN)

( * ) Notice: Subject to any disclaimer, the term of this patent is extended or adjusted under 35 U.S.C. 154(b) by 246 days.

(21) Appl. No.: 15/032,537

(22) PCT Filed: May 23, 2014

(86) PCT No.: PCT/CN2014/078258
§ 371 (c)(1),
(2) Date: Apr. 27, 2016

(87) PCT Pub. No.: WO2015/062257
PCT Pub. Date: May 7, 2015

(65) Prior Publication Data
US 2016/0272892 A1 Sep. 22, 2016

(30) Foreign Application Priority Data

Nov. 1, 2013 (CN) .......................... 2013 1 0535798

(51) Int. Cl.
*C09K 21/12* (2006.01)
*C09D 7/63* (2018.01)
(Continued)

(52) U.S. Cl.
CPC .............. *C09K 21/12* (2013.01); *C09D 5/185* (2013.01); *C09D 7/63* (2018.01); *D06M 13/282* (2013.01);*D21H 17/07* (2013.01); *D21H 17/10* (2013.01); *D21H 17/25* (2013.01); *D21H 17/28* (2013.01); *D21H 17/71* (2013.01); *D21H 21/34* (2013.01); *C08K 5/0066* (2013.01)

(58) Field of Classification Search
CPC .......... C09K 21/12; C09D 7/63; C09D 5/185; D21H 17/07; D21H 17/71; D21H 17/10; D21H 17/28; D21H 17/25; D21H 21/34; D06M 13/282; C08K 5/0066
See application file for complete search history.

(56) References Cited

U.S. PATENT DOCUMENTS 5,387,655 A * 2/1995 Aslin .................... C08K 5/521
524/115

FOREIGN PATENT DOCUMENTS

CN        102504645 A  *  6/2012

OTHER PUBLICATIONS

English Translation of CN102504645 (Year: 2012).*

* cited by examiner

*Primary Examiner* — Peter F Godenschwager
*Assistant Examiner* — Andrew J. Oyer
(74) *Attorney, Agent, or Firm* — Cesari and McKenna, LLP

(57) ABSTRACT

This disclosure provides high-efficiency and low-energy-consumption synthetic methods of a series of phosphorus-nitrogen-based intumescent flame retardants and the use thereof in paint flame retarding. 1 part by weight of a phosphorization agent and 0.5-4.0 parts by weight of a nitrogen-containing foaming agent are uniformly mixed and stirred at room temperature, and an amount of water is further added to emit heat and initiate reaction. 0.5-3.0 parts by weight of a charring agent and 0.5-4.0 parts by weight of a hydroxy-containing polyfuctional crosslinking agent are then added, and reacted with stirring. An amine compound is finally added for neutralization until pH value is 5-8, and solid liquid separation is performed. The solid portion is dried to obtain a main body portion of a phosphorus-nitrogen-based intumescent flame retardant. The resultant filtrate is diluted with ⅓-⅔ volume of water, and a flame retardant product is obtained. This flame retardant product is mainly used in the flame retarding of paper and cotton (Continued)

| Nb | 0.00 |
|---|---|
| / | |
| Fe | 0.01 |
| Ca | 0.02 |
| Al | 0.01 |
| / | |
| Cl | 0.06 |
| N | 24.88 |
| C | 26.40 |
| P | 13.41 |
| O | 35.21 | fabrics. The main body and different proportions of other nitrogen-containing foaming agents and charring agents are uniformly mixed and pulverized into nano- and micro-scale, and a phosphorus-nitrogen-based intumescent flame retardant is obtained. The nano- and micro-scale phosphorus-nitrogen intumescent flame retardant is mixed into a paint at a weight ratio of 15-30%, to obtain a flame-retardant paint which is capable of maintaining mechanical and physical properties of the paint. The phosphorus-nitrogen-based intumescent flame retardant of this disclosure is an intumescent flame retardant having a synergistic effect of phosphorus and nitrogen.

12 Claims, 6 Drawing Sheets

(51) Int. Cl.
*D21H 17/07* (2006.01)
*D21H 17/00* (2006.01)
*D06M 13/282* (2006.01)
*D21H 17/10* (2006.01)
*D21H 17/28* (2006.01)
*D21H 17/25* (2006.01)
*D21H 21/34* (2006.01)
*C09D 5/18* (2006.01)
*C08K 5/00* (2006.01)

| | |
|---|---|
| Nb | 0.00 |
| / | |
| Fe | 0.01 |
| Ca | 0.02 |
| Al | 0.01 |
| / | |
| Cl | 0.06 |
| N | 24.88 |
| C | 26.40 |
| P | 13.41 |
| O | 35.21 |

Fig. 1

National Center for Safety Quality Supervision and Testing of
Fire-proof Building Products Test Report Report No.: 201212270  Page 1 (3 Pages in Total)

| Product Name | Fire-proof Paint Strip | Model/Type | / |
|---|---|---|---|
| Client | School of Chemistry and Materials Science, University of Science and Technology of China | Trade Mark | / |
| Marked Manufacturer | / | Kind of Test | Entrusted Test |
| Applicant | School of Chemistry and Materials Science, University of Science and Technology of China | Sampling Base | / |
| Sampling Body | Self Sample Delivery | Sampling Date | / |
| Sampling Site | / | Receipt Date | 2012.12.04 |
| Test Site | This Center | Test Date | 2012.12.07 |
| Sample Quantity | 150mm × 10mm × 2mm, 9 Pieces | Sample No. | 201216208 |
| Test Criteria | GB/T 2406.2-2009 (Plastics, Determination of Combustion Behavior Using Oxygen Index Method, Part 2: Room Temperature Test) | | |
| Test Item | Oxygen Index | | |
| Test Conclusion | Upon test, this article has an oxygen index of 30.1% (it is blank below)<br><br>Issued Date: December 11, 2012 | | |
| Note | | | |

Approved by: *Min DING*   Audited by: *Chenggang YUAN*   Compiled by: *Songlin LIU*

Fig. 5

Anhui Provincial Supervising & Testing Research Institute for Product Quality

TEST REPORT (2013) Anhui Test H No. 01080　　　　　　　　　　　　　　　　　　　　Page 1 (2 Pages in Total)

| Product Name | Light-smell fully environment-friendly PU half matt gloss white topcoat (+KW227 flame retardant) | Model/Type | Topcoat for furniture plants and decoration |
|---|---|---|---|
| Manufacture | Guangdong Huarun Paints Co., Ltd. | Inspected Body | University of Science and Technology of China |
| Client | University of Science and Technology of China | Sampling Body | / |
| Client Address | University of Science and Technology of China, 96 Jinzhai Road, Hefei, Anhui Province | Sampling Site | / |
| Test Items | Eighteen items in total (see the appendix for details) | Sample Character and Condition | The appearance is not abnormal |
| Test Date | 2013.05.09-2013.05.27 | Serial Number/ Manufactured Date | 20068114 |
| Trade Mark | Huarun | Sealing Staff | / | Checking and Sealing Samples | / |
| Kind of Test | Entrusted Test | Sampling Base | / | Samples Quantity | 1 set |
| Sample Grade | / | Sampling Date | / | Receipt Date | 2013-4-25 |
| Test Criteria | GB/T23997-2009&GB18581-2009 | | | | |
| Test Conclusion | The items of this sample tested according to standards GB/T2 3997-2009 & GB18581-2009 are qualified.<br><br>(Exclusive seal for test report)<br>Issued Date: May 30, 2013 | | | | |
| Note | The KW227 flame retardant is provided by Wang Zhiyong research team of School of Chemistry and Materials Science, University of Science and Technology of China. | | | | |

Approved by: *Dayong CHU*　　Audited by: *Wenjia FANG*　　Tested by: *Yaxue GONG*

Fig. 6a

Anhui Provincial Supervising & Testing Research Insitute for Product Quality
Appendix for Test Report ( 2013 ) Anhui Test H No. 01080    Page 2 (2 Pages in Total)

| No. | Name of Tested Item | | Technical Requirement | Test Result | Judgment for Individual Item |
|---|---|---|---|---|---|
| / | / | | Topcoat for furniture plants and decoration | / | / |
| 1. | Constructability | | No obstruction in application | Accordant | Qualified |
| 2. | Drying time | Apparent drying time (h) | ≤1 | Passed | Qualified |
|    |             | Actual drying time (h) | ≤24 | Passed | Qualified |
| 3. | Appearance of coating film | | Normal | Normal | Qualified |
| 4. | Storage stability (50°C, 7d) | | No abnormity | No abnormity | Qualified |
| 5. | Adherence (cross cut interval 2mm) (grade) | | ≤1 | 0 | Qualified |
| 6. | Pencil hardness (scratch) | | ≥HB | 2H | Qualified |
| 7. | Dry heat resistance [(90±2)°C, 15min] (grade) | | ≤2 | 1 | Qualified |
| 8. | Abrasion resistance (750g, 500r) (g) | | ≤0.050 | 0.045 | Qualified |
| 9. | Water resistance (24h) | | No abnormity | No abnormity | Qualified |
| 10. | Alkali resistance (2h) | | No abnormity | No abnormity | Qualified |
| 11. | Alcohol resistance (8h) | | No abnormity | No abnormity | Qualified |
| 12. | Stain resistance (1h) | Vinegar | No abnormity | No abnormity | Qualified |
|     |                        | Tea | No abnormity | No abnormity | Qualified |
| 13. | Volatile organic compound (VOC) content (g/L) Gloss (60°) <80 | | ≤670 | 600 | Qualified |
| 14. | Content of benzene (%) | | ≤0.3 | Not Detected | Qualified |
| 15. | Total content of toluene, xylene, and ethylbenzene (%) | | ≤30 | 25 | Qualified |
| 16. | Content of halogenated hydrocarbon (%) | | ≤0.1 | Not Detected | Qualified |
| 17. | Total content of free diisocyanate (TDI, HDI) (%) | | ≤0.4 | 0.1 | Qualified |
| 18. | Content of soluble heavy metals (mg/kg) | Lead Pb | ≤90 | 1 | Qualified |
|     |  | Cadmium Cd | ≤75 | <1 |  |
|     |  | Chromium Cr | ≤60 | 1 |  |
|     |  | Mercury Hg | ≤60 | Not Detected |  |

Note: Technical requirements of items 13-18 are judged according to the indices of topcoats in polyurethane paints in GB18581-2009.
Ratio: mainbody: solid: diluent: retardant = 1: 0.4: 0.4: 0.32

Fig. 6b

PHOSPHORUS-NITROGEN-BASED INTUMESCENT FLAME RETARDANT AND SYNTHETIC METHOD AND USE THEREOF

CROSS REFERENCE TO RELATED APPLICATIONS

This application is the National Stage of International Application No. PCT/CN2014/078258, filed on May 23, 2014, which claims priority to Chinese Application No. 201310535798.5 filed on Nov. 1, 2013. The contents of both applications are hereby incorporated by reference in their entirety.

TECHNICAL FIELD

This disclosure relates to a phosphorus-nitrogen-based intumescent flame retardant, and a synthetic method and a use thereof, and to uses of related flame retardants in wood, cotton cloth, and paper.

BACKGROUND ART

The most important problem of public safety is fire. As the degree of industrialization is increased and the extent of urbanization is enlarged, the hazard caused by fire is more severe. In industrially developed countries, the key point of fire extinguishing and prevention is tilted from "extinguishing" to "prevention", and the requirements for flame retardancy are being put into effect in various materials in daily life. As is well known, at present, flame retardants used in our country are mainly conventional flame retardants. Although conventional inorganic flame retardants and halogen-based flame retardants have high efficiency of flame retardancy and wide range of applications, most of them have remarkably adverse effects on mechanical and physical properties of base materials. More importantly, most of halogen-containing flame-retardant materials have secondary hazards, such as large amount of smoke, emission of toxic or corrosive gases, etc., in combustion, and environment and human safety are severely threatened. The requirements for high-efficiency flame retardants have become more and more apparent in modern society. As compared to inorganic flame retardants and halogen-containing flame retardants, phosphorus-containing flame retardants have very remarkable advantages, such as low price, no toxicity, no metal, wide application range for base materials, and thus have become the decided trend of development in the industry of flame retardants. The phosphorus-nitrogen-based intumescent flame retardants are a type of flame retardant which has well developed in recent period. It is composed of three parts, which are an acid source (a dehydration agent), a gas source (a nitrogen-containing foaming agent), and a carbon source (a charring agent). Plastics, to which these flame retardants with phosphorus and nitrogen as main active elements are added, may generate a uniform and compact foam layer on the surface when heated. This foam layer insulates heat, blocks oxygen, and inhibits smoke. Furthermore, it may inhibit the melt drip phenomenon to some extent, and thus has significant flame-retardant effect. It is to be emphasized that the flame-retardant effect of the phosphorus-nitrogen-based intumescent flame retardant is greatly related with the added amount of the flame retardant, and a good flame-retardant effect may be obtained only if the added amount reaches a certain proportion. In addition, an optimal flame-retardant effect for a base material may be effectively obtained only if the phosphorus-nitrogen intumescent flame retardant matches with the type of high polymer.

Since fires cause great direct economic loss and subsequent long-term social loss, the prevention becomes more and more important and urgent. It is desirable to take preventive measures, such as flame retarding, in various aspects of social life. However, with respect to oily paints frequently used in the construction industry and daily life, there is still no flame retardant with good effect at present. This is because paints are organic polymer materials, which are difficult to be flame-retardant. The addition of conventional inorganic flame retardants and halogen-based flame retardants will cause deterioration in mechanical and physical properties of paints, such as loss of gloss, poor water resistance, easy generation of cracks, and reduction of adherence. Therefore, the flame retarding of paints has been always a great challenge in the field of flame retardants. To our knowledge, there are only several patented technologies related to the flame retarding of paints over the world. All of these flame retardants have a few common disadvantages, such as the influence on mechanical and physical properties of paints, containing halogen, high production cost, etc. As an example, the cyclic phosphate ester in European Patent EP 389,433 has high cost and complex process flow. Furthermore, it is only suitable for a few types of paints. As another example, in U.S. patent application US2010/132332A1, the flame retardant has good compatibility with resins, but it has complex production process and relatively high cost. It is mainly used in the flame retarding of plastic and rubber products, and has a certain limit for the application range of resins. Romanian Patent Rom.RO 94,457 has disclosed a formulation of a flame-retardant paint, which uses non-flammable phthalate linseed oil as a base material, with ammonium hydrogen phosphate hydrate and sodium carbonate added as flame retardants. This is a fireproof linseed oil coating, rather than a fireproof paint with corrosion-resistant and protective effects in conventional sense. Ammonium hydrogen phosphate and sodium carbonate are inorganic salts, which have poor compatibility with paints, are prone to absorb moisture, and will change mechanical and physical properties of most resins. Chinese patent application CN101629043A discloses a fireproof flame-retardant paint. However, this paint is only used as the flame-retardant on ferrous metal surfaces, and phosphorus oxychloride, which is a highly toxic and highly corrosive compound, is involved in the production process. U.S. Pat. No. 6,686,403 discloses a formulation of flame-retardant paint, formed by using melamine, pentaerythritol, and melamine phosphate in a certain ratio, as raw materials of acid source and carbon source, and stirring and mixing uniformly with a paint component, and the flame-retardant effect may be obtained only if a paint baking process is carried out. Therefore, this technology does not solve the problem to allow for wide-range flame retarding of various paints, either. The flame retardant of the present disclosure is different from the inventions which have been reported and has inventiveness.

SUMMARY

The present disclosure addresses to a phosphorus-nitrogen-based intumescent flame retardant and a synthetic method and a use thereof. The synthetic method is an environmentally-friendly method. The flame retardant is applicable in common paints, including polyurethane paints, epoxy resin paints, alkyd paints, etc., and solves the problems of flame-retardant wood, cotton cloth and paper, such as poor feeling, getting damp, etc. At the meanwhile, the current uses of inorganic flame retardants and halogen flame retardants, as well as environmental pollution and damage to human bodies caused thereby, are reduced.

In one embodiment of this disclosure, there is provided a phosphorus-nitrogen-based intumescent flame retardant, comprising a flame retardant main body obtained by a reaction of a phosphorization agent, a second nitrogen-containing foaming agent, a second charring agent, and a hydroxy-containing polyfuctional crosslinking agent.

In one embodiment of this disclosure, the flame retardant further comprises a first nitrogen-containing foaming agent and a first charring agent.

In one embodiment of this disclosure, the ratio of said flame retardant main body:said first nitrogen-containing foaming agent:said first charring agent is 1-3:0.5-1.5:0.2-1.2.

In one embodiment of this disclosure, said first nitrogen-containing foaming agent and said second nitrogen-containing foaming agent may be the same or may be different, are each independently a physical nitrogen-containing foaming agent or a chemical nitrogen-containing foaming agent, and are each independently a liquid, a gas or a solid.

In one embodiment of this disclosure, said first nitrogen-containing foaming agent and said second nitrogen-containing foaming agent are each independently selected from the group consisting of ammonium hydrogen carbonate, melamine, polyphosphamide, urea, semicarbazide, a hydrazine compound, a guanidine compounds and an azo compound.

In one embodiment of this disclosure, said first charring agent and said second charring agent may be the same or may be different, and/or said first charring agent and said second charring agent are each independently a liquid, a gas, or a solid.

In one embodiment of this disclosure, said first charring agent and said second charring agent may be each independently selected from the group consisting of an amylose, a pllulan, a cyclodextrin, a saccharide compound, and a polyol amine compound.

In one embodiment of this disclosure, said phosphorization agent is red phosphorus, phosphorus pentaoxide, phosphoric acid, pyrophosphoric acid, polyphosphoric acid, phosphamide, polyphosphamide, or phosphorus oxychloride.

In one embodiment of this disclosure, said hydroxy-containing polyfuctional crosslinking agent is ethylene glycol, glycerol, pentaerythritol, phloroglucinol, hydroquinone, aminoethanol, aminopropanol, or an alcoholamine compound.

In one embodiment of this disclosure, an alkali is added at the end of the reaction of said phosphorization agent, said second nitrogen-containing foaming agent, said second charring agent, and said hydroxy-containing polyfuctional crosslinking agent, to adjust the pH value of the reaction liquid to 5-8.

In one embodiment of this disclosure, said alkali is an inorganic alkali or an organic alkali.

In one embodiment of this disclosure, said alkali is a hydroxide or an amine compound.

In one embodiment of this disclosure, said alkali is an aqueous methylamine solution, ethylene diamine, triethylamine, aniline, aqueous ammonia, or an alcohol amine compound.

In one embodiment of this disclosure, the infrared spectrum of said phosphorus-nitrogen-based intumescent flame retardant has the following characteristic absorptions: 3395 cm$^{-1}$, 3231 cm$^{-1}$, 1781 cm$^{-1}$, 1736 cm$^{-1}$, 1536 cm$^{-1}$, 1447 cm$^{-1}$, 1084 cm$^{-1}$, 1020 cm$^{-1}$, and 527 cm$^{-1}$.

In one embodiment of this disclosure, the mass spectrum of said phosphorus-nitrogen-based intumescent flame retardant has the following characteristic peaks: a base peak at m/e=263.0, and other feature peaks at m/e=223.0, 247.1, 274.3, 284.9, 318.3, 330.4, 382.9, 404.8, 484.8, 524.8, 626.7.

In one embodiment of this disclosure, said phosphorization agent and said second nitrogen-containing foaming agent are first reacted in the presence of an initiator, and then said second charring agent and said hydroxy-containing polyfuctional crosslinking agent are added, in the reaction of said phosphorization agent, said second nitrogen-containing foaming agent, said second charring agent, and said hydroxy-containing polyfuctional crosslinking agent.

In one embodiment of this disclosure, the initiator is water or an aqueous alkaline solution.

In one embodiment of this disclosure, the weight ratio of the phosphorization agent to the first nitrogen-containing foaming agent is 1:0.5 to 1:4.0.

In one embodiment of this disclosure, the weight ratio of the phosphorization agent to the first charring agent is 1:0.5 to 1:3.0.

In one embodiment of this disclosure, the weight ratio of the phosphorization agent to the hydroxy-containing polyfuctional crosslinking agent is 1:0.5 to 1:4.0.

In one embodiment of this disclosure, the particle size of the flame retardant is 0.4-20.0 micrometers.

In one embodiment of this disclosure, the phosphorus content of the flame retardant is 8-23%.

In one embodiment of this disclosure, the nitrogen content of the flame retardant is 10-34%.

In one embodiment of this disclosure, there is provided a method of preparing a phosphorus-nitrogen-based intumescent flame retardant, comprising the following steps: a) a flame retardant main body preparing step, wherein a phosphorization agent, a second nitrogen-containing foaming agent, a second charring agent, and a hydroxy-containing polyfuctional crosslinking agent are reacted to obtain a reaction system containing a flame retardant main body; b) a filtering step, wherein the solid in the reaction system is filtered off and dried to obtain the flame retardant main body; and c) a mixing step, wherein said flame retardant main body is mixed with a first nitrogen-containing foaming agent and a first charring agent.

In one embodiment of this disclosure, said phosphorization agent and said second nitrogen-containing foaming agent are first reacted in the presence of an initiator, and then said second charring agent and said hydroxy-containing polyfuctional crosslinking agent are added, in said flame retardant main body preparing step.

In one embodiment of this disclosure, after said flame retardant main body preparing step and before said filtering step, an alkali is added to adjust the pH value of the reaction liquid to 5-8.

In one embodiment of this disclosure, the alkali is an inorganic alkali or an organic alkali.

In one embodiment of this disclosure, the alkali is a hydroxide or an amine compound.

In one embodiment of this disclosure, the alkali is an aqueous methylamine solution, ethylene diamine, triethylamine, aniline, aqueous ammonia, or an alcohol amine compound.

In one embodiment of this disclosure, after said filtering step and before said mixing step, a step of drying said flame retardant main body is further comprised.

In one embodiment of this disclosure, the phosphorus-nitrogen-based intumescent flame retardant is uniformly pulverized to 0.4-20.0 micrometers in said mixing step.

In one embodiment of this disclosure, there is provided a use of the phosphorus-nitrogen-based intumescent flame retardant in the flame retarding of paint.

In one embodiment of this disclosure, said phosphorus-nitrogen-based intumescent flame retardant is mixed into a paint at a weight ratio of 15-30%.

In one embodiment of this disclosure, the main component of the paint is a polyurethane, an epoxy resin, an alkyd resin, a urea resin, or a phenolic resin.

In one embodiment of this disclosure, there is provided a flame-retardant paint, comprising a paint body and the phosphorus-nitrogen-based intumescent flame retardant of this disclosure.

In one embodiment of this disclosure, the flame-retardant paint has a limiting oxygen index (LOI) of 28-35% as determined according to National Standard GB5454-85.

In one embodiment of this disclosure, the mechanical and physical properties of the flame-retardant paint reach respective indices of National Standards GB/T 23997-2009 and GB18581-2009.

In one embodiment of this disclosure, there is provided a use of the phosphorus-nitrogen-based intumescent flame retardant in the flame retarding of wood, cotton cloth, and paper.

In one embodiment of this disclosure, wood, cotton cloth, or paper are soaked in a dispersion of the phosphorus-nitrogen-based intumescent flame retardant and then withdrawn and dried.

In one embodiment of this disclosure, there is provided a flame-retardant wood, containing the phosphorus-nitrogen-based intumescent flame retardant of this disclosure.

In one embodiment of this disclosure, the limiting oxygen index LOI of flame-retardant wood is greater than 40%.

In one embodiment of this disclosure, there is provided a flame-retardant cotton cloth, containing the phosphorus-nitrogen-based intumescent flame retardant of this disclosure.

In one embodiment of this disclosure, the limiting oxygen index LOI of flame-retardant cotton cloth is greater than 35%.

In one embodiment of this disclosure, there is provided a flame-retardant paper, containing the phosphorus-nitrogen-based intumescent flame retardant.

In one embodiment of this disclosure, the limiting oxygen index LOI of flame-retardant paper is greater than 30%.

In this disclosure, there is provided a general method for preparing a series of phosphorus-nitrogen-based intumescent flame retardants. In one embodiment, 1 part by weight of a phosphorization agent is added to a mixing container, to which 0.5-4 parts by weight of a second nitrogen-containing foaming agent are then added in batches with stirring, and are rapidly stirred at room temperature until they are uniformly stirred and mixed, and subsequently a certain amount of water is added so as to initiate reaction. After the reaction is complete, 0.5-3 parts by weight of a second charring agent are added in batches to the mixing container, then 0.5-4 parts by weight of a hydroxy-containing polyfuctional crosslinking agent are added in batches to the mixing container, and stirring is continued to allow for complete reaction. An amine compound for neutralization is finally added with controlling stirring speed and reaction temperature, until pH value is 5-8. After filtration or pressure filtration and drying, a main body portion of the phosphorus-nitrogen-based intumescent flame retardant is obtained. This main body portion, a first nitrogen-containing foaming agent, and a first charring agent are uniformly mixed at a ratio of (1-3:0.5-1.5:0.2-1.2) and are pulverized into a nano-/micro-scale, and the phosphorus-nitrogen-based intumescent flame retardant is obtained. The resultant filtrate is diluted with ⅓-⅔ of water, and a flame retardant product is obtained.

The phosphorus-nitrogen flame retardant typically comprises three components, which are an acid source (a dehydration agent), a gas source (a nitrogen-containing foaming agent), and a carbon source (a charring agent), wherein, phosphorus and nitrogen are main active elements and have synergistic effect, the nitrogen-containing component accelerates the process of dehydration and heat absorption of phosphoric acid, while the amino moiety is catalytically converted into a non-flammable nitrogen-containing gas. The charring agent is carbonized after being catalytically dehydrated, and forms a uniform and compact foaming layer together with a resin on the surface. This foaming layer insulates heat, blocks oxygen, inhibits smoke, and may inhibit the melt drip phenomenon to some extent, thus it has a significant flame-retardant effect. The addition of the polyhydroxy crosslinking agent does not only increase the effect of dehydration and heat absorption, but also facilitate densification and non-flammability of the film, and thus effectively improves the flame-retardant effect.

In one embodiment, the phosphorus-nitrogen-based intumescent flame retardant is sparingly soluble in most organic solvents and is slightly soluble in water; and has a stable chemistry, good compatibility with high-molecular polymers, and is not layered after standing.

The phosphorus-nitrogen-based intumescent flame retardant of this disclosure is applicable for various types and brands of paints currently available in the market. Types of tested paints include high-molecular polymers, such as polyester and polyurethane paints, alkyd paints, epoxy resin paints, polyvinyl chloride paints, quick-drying primers, etc. The brands of the paints include: Huarun brand polyurethane paint, Nippon brand polyurethane varnish, and a quick-drying primer and a polyurethane paint from Hefei Liguang Paints Co., Ltd. When 5 grams of the phosphorus-nitrogen-based intumescent flame retardant of this disclosure is added to 20 grams of a paint, a good flame-retardant effect is achieved. For example, a flame-retardant paint having a limiting oxygen index up to 30.1% may be obtained by adding this flame retardant in a ratio of 25% (by weight) to a flammable polyurethane paint (Huarun brand) (FIG. 5). The mechanical and physical properties of the flame-retardant paint after addition may reach respective performance indices required by standards GB/T23997-2009 and GB18581-2009.

Particular mechanical and physical properties are as follows: apparent drying time≤1 hours; actual drying time≤24 hours; the appearance of the paint film=normal; storage stability (50° C., 7 d)=normal; adherence=grade 0; pencil hardness (scratch)≥2H; dry heat resistance=1; abrasion resistance=0.045; water resistance≤24 hours; alkali resistance≤2 hours; alcohol resistance≤8 hours; stain resistance≤1 hour; volatile organics (g/L)=600; benzene content (%)=0; total content (%) of toluene, xylene, and ethylbenzene=25; halogenated hydrocarbon content (%)=0; total content (%) of free diisocyanate=0.1; lead content (mg/kg)=1; cadmium content (mg/kg)<1; chromium content (mg/kg)=1; mercury content (mg/kg)=0;

The flame retardant of this disclosure fills up a gap in the types of flame retardants, and solves the problem for a long time that flame retardants cannot be compatible with paints and do not have wide range of application for paints. By adding the flame retardant of this disclosure to various types of paints at a certain ratio, the paints have flame-retardant functions similar to fireproof coatings while decorative properties and other mechanical and physical properties of original paints are remained. Compared to current flame retardants, the flame retardant of this disclosure does not contain halogen or metal, and has the advantages of low price of raw materials, low energy consumption for production, a number of functions, small influences on mechanical and physical properties of paint bases, etc. As a comparison, most flame retardants have great influences on mechanical and physical properties of bases. For example, when red phosphorus, antimony (III) oxide, and aluminum hydroxide are added to a cable or polystyrene, the cable is caused to wrinkle, and thus the toughness and the impact strength of the base are reduced; when polyphosphamide is added to a paint, the paint is caused to lose gloss, and the adherence is decreased and the water resistance is reduced; and when a phosphate ester compound is added to a paint, the paint is layered; and so on.

BRIEF DESCRIPTION OF DRAWINGS

FIG. 1: Elemental analysis data of the phosphorus-nitrogen-based intumescent flame retardant of Example 1, wherein the testing instrument is an XRF-1800 X-ray fluorescence spectrometer (SHIMADZU Corporation);

FIG. 5: Test results for limiting oxygen index of the flame-retardant paint of Example 1;

FIG. 6a: Test report for mechanical and physical properties of the flame-retardant paint of Example 1;

FIG. 6b: Test report appendix for mechanical and physical properties of the flame-retardant paint of Example 1.

DESCRIPTION OF EMBODIMENTS

EXAMPLES

Example 1

Figure 2:
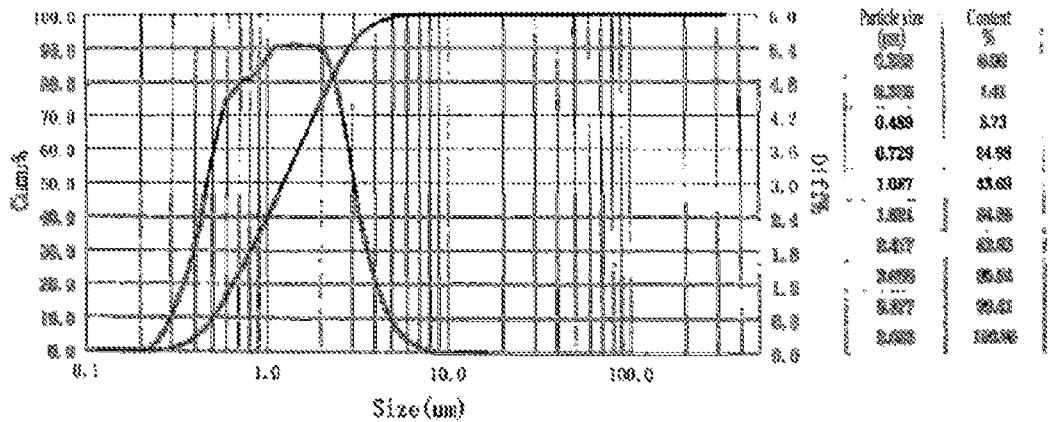
FIG. 2: Particle size distribution data of the phosphorus-nitrogen-based intumescent flame retardant of Example 1.
Figure 3:
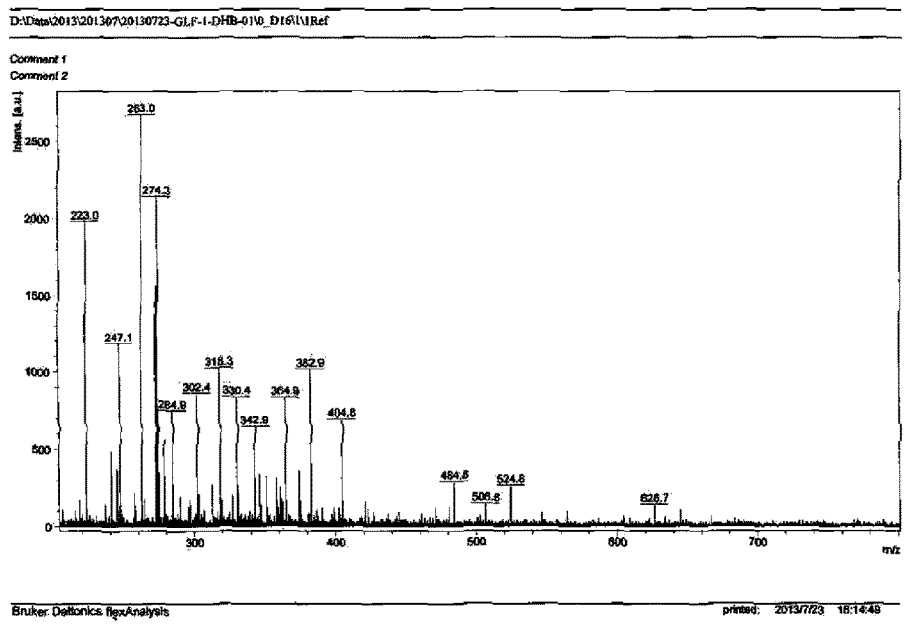
FIG. 3: Mass spectrometry data of the phosphorus-nitrogen-based intumescent flame retardant of Example 1.
Figure 4:
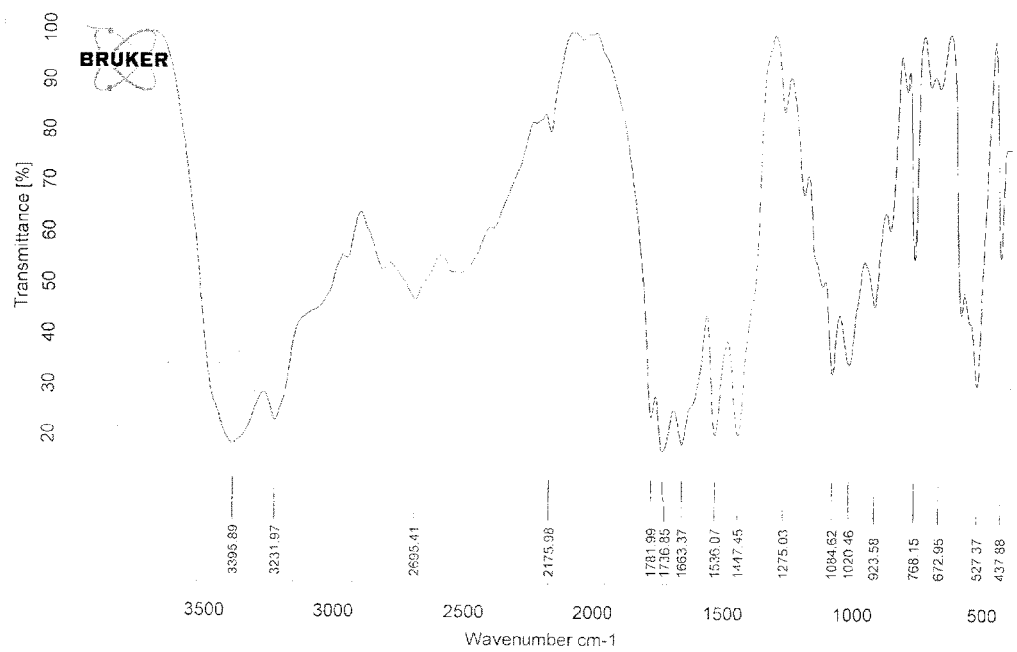
FIG. 4: Infrared spectrum of the phosphorus-nitrogen-based intumescent flame retardant of Example 1.

In a 250-milliliter beaker, 10 grams of polyphosphoric acid were added, then 10 grams of a nitrogen-containing foaming agent (melamine) were added in batches, followed by uniform stirring. An appropriate amount of water was added to initiate reaction, and sufficient reaction was allowed. 6 grams of a charring agent, such as cellulose, were further added to continue the reaction; and then a hydroxy-containing polyfuctional crosslinking agent, such as 10 grams of hydroquinone and 5 grams of a polyol, was added. After the reaction was complete, the product was cooled to room temperature. An amine such as an aqueous methylamine solution was then added at a temperature of 15-40° C. for neutralization until pH was 5-8. Subsequently filtration was performed and filter residue was dried to obtain a flame retardant main body. The resultant flame retardant main body, melamine phosphate, and pentaerythritol were mixed at a ratio of (1-3:0.5-1.5:0.2-1.2) and were uniformly pulverized to obtain a phosphorus-nitrogen intumescent flame retardant. The resultant byproduct filtrate was diluted with ⅓ water, and a flame retardant product was obtained.

6 grams of this flame retardant were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:

flame retarding time of 10 minutes (big panel method);
flame propagation rate of 38% (tunnel method);
carbonization volume, weight loss of 9 g (cabinet method);
paint strip limiting oxygen index (LOI) of 30.1%.

The mechanical and physical properties reached the standards of GB/T23997-2009 and GB18581-2009.

Example 2

According to the method described in Example 1, the amount of polyphosphoric acid used was kept unchanged, but the ratio of polyphosphoric acid to the second charring agent (pentaerythritol) therein was changed to the values listed in Table 1, and the experiment described above was performed. The experimental results were given in Table 1.

TABLE 1

Experimental results at different weight ratios of the phosphorization agent to the hydroxy-containing polyfuctional crosslinking agent

| Phosphorization agent:pentaerythritol (weight ratio) | Flame retarding time (minute) | Flame propagation rate | Combustion weight loss (gram) | Paint strip limiting oxygen index |
|---|---|---|---|---|
| 1:0.5 | 7 | 50% | 12.5 | 24.3 |
| 1:1 | 8 | 42% | 11 | 26.5 |
| 1:2 | 9 | 39% | 10 | 28.9 |
| 1:3 | 7.5 | 45% | 11.8 | 25.0 |
| 1:4 | 7 | 53% | 13 | 24.5 |

It can be seen from the above table that all ratios of the phosphorization agent to the crosslinking agent within 11 may obtain satisfactory results, and the result at 1:2 was particularly notable.

Example 3

The Flame-Retardant Effect of the Flame Retardant Main Body:

6 grams of the flame retardant main body in Example 1 were added to 20 grams of a polyurethane paint, followed by uniform mixing, and they were coated onto a five-ply board base material By means of GB12441-2005, a national standard for fireproof coatings (there was no standard for flame-retardant paints at present), the properties of the flame-retardant paint after being coated onto a wood five-ply board base material were as follows:

flame retarding time of 7 minutes (big panel method);
flame propagation rate of 50% (tunnel method);
carbonization volume, weight loss of 12.5 grams (cabinet method);
paint strip limiting oxygen index (LOI) of 24.5%.

Example 4

The Comparison in the Case where No Crosslinking Agent was Used:

In a 250-milliliter beaker, 10 grams of polyphosphoric acid were added, then 10 grams of a nitrogen-containing foaming agent (melamine) were added in batches, followed by uniform stirring. An appropriate amount of water was added to initiate reaction, and sufficient reaction was allowed. 6 grams of a charring agent, such as cellulose, were further added and allowed for sufficient reaction, during this process no crosslinking agent was added. After the reaction was complete, the product was cooled to room temperature. An amine such as an aqueous methylamine solution was then added at a temperature of 15-40° C. for neutralization until pH was 5-8. Subsequently filtration was performed and filter residue was dried. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing, and they were coated onto a five-ply board base material. By means of GB12441-2005, a national standard for fireproof coatings (there was no standard for flame-retardant paints at present), the properties of the flame-retardant paint after being coated onto a wood five-ply board base material are as follows:

flame retarding time of 6.5 minutes (big panel method);
flame propagation rate of 55% (tunnel method);
carbonization volume, weight loss of 13 grams (cabinet method);
paint strip limiting oxygen index (LOI) of 24%.

Example 5

Following the same method as Example 4, but different crosslinking agents (10 grams) as shown in Table 2 were used, and the obtained results were shown in Table 2.

TABLE 2

Experimental data of flame retardants obtained by using the same preparation method but changing different crosslinking agents

| Crosslinking agent | Flame retarding time (minute) | Flame propagation rate | Combustion weight loss (gram) | Paint strip limiting oxygen index |
|---|---|---|---|---|
| None | 6.5 | 55% | 13 | 24.0 |
| Hydroquinone | 10 | 38% | 9 | 30.1 |
| Ethylene glycol | 8 | 46% | 11.2 | 26.5 |
| Pentaerythritol | 9 | 41% | 10 | 28.6 |

It can be seen from the above table that a polyol compound may be used as a crosslinking agent in this disclosure, and the effects of polyphenols were particularly notable.

Example 6

The Comparison in the Case where Ammonium Hydrogen Carbonate was Used as a Foaming Agent:

In a 250-milliliter beaker, 10 grams of polyphosphoric acid were added, then 10 grams of a foaming agent (ammonium hydrogen carbonate) were added in batches, followed by uniform stirring. An appropriate amount of water was added to initiate reaction, and sufficient reaction was allowed. 6 grams of a charring agent such as cellulose and a polyol crosslinking agent were further added for further reaction. After the reaction was complete, the product was cooled to room temperature. An amine such as an aqueous methylamine solution was then added at a temperature of 15-40° C. for neutralization until pH was 5-8. Subsequently, filtration was performed and filter residue was dried. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:

flame retarding time of 5 minutes (big panel method);
flame propagation rate of 60% (tunnel method);
carbonization volume, weight loss of 14.5 grams (cabinet method);
paint strip limiting oxygen index (LOI) of 22.0%.

Example 7

Following the same method as Example 6, but 10 grams of foaming agents as shown in Table 3 were used, and the obtained results were given in Table 3.

TABLE 3

Experimental data of flame retardants obtained by using the same preparation method but changing different foaming agents

| Foaming agent | Flame retarding time (minute) | Flame propagation rate | Combustion weight loss (gram) | Paint strip limiting oxygen index |
|---|---|---|---|---|
| Melamine | 10 | 38% | 9 | 30.1 |
| Polyphosphamide | 9 | 41% | 10 | 28.5 |
| Urea | 9 | 43% | 10.5 | 27.8 |
| Semicarbazide | 11 | 36% | 9 | 29.6 |
| Guanidine phosphate | 8 | 46% | 12 | 26.8 |
| Aminoethanol | 7 | 51% | 13 | 24.5 |

It can be seen from the above table that an amine compound may be used as a foaming agent in this disclosure, and the effect of semicarbazide was particularly notable.

Example 8

The Comparison in the Case where Phloroglucinol was Used as a Charring Agent:

In a 250-milliliter beaker, 10 grams of polyphosphoric acid were added, then 8 grams of a foaming agent (melamine) were added in batches, followed by uniform stirring. An appropriate amount of water was added to initiate reaction, and sufficient reaction was allowed. 6 grams of a charring agent (phloroglucinol) and a polyol crosslinking agent were further added for further reaction. After the reaction was complete, the product was cooled to room temperature. An amine such as an aqueous methylamine solution was then added at a temperature of 15-40° C. for neutralization until pH was 5-8, and subsequently filtration was performed and filter residue was dried. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:

flame retarding time of 8 minutes (big panel method);
flame propagation rate of 46% (tunnel method);
carbonization volume, weight loss of 11.5 grams (cabinet method);
paint strip limiting oxygen index (LOI) of 26.5%.

Example 9

Following the same method as Example 8, but 6 grams of charring agents as shown in Table 4 were used, and the obtained results were shown in Table 4.

TABLE 4

Experimental data of flame retardants obtained by using the same preparation method but changing different charring agents

| Second charring agent | Flame retarding time (minute) | Flame propagation rate | Combustion weight loss (gram) | Paint strip limiting oxygen index |
|---|---|---|---|---|
| Cellulose | 8 | 44% | 12 | 26.8 |
| Starch | 6 | 64% | 14 | 24.2 |
| Cyclodextrin | 8 | 43% | 11.5 | 27.0 |
| Trisphenol | 9 | 38% | 10 | 29.2 |
| Glycerol | 8 | 45% | 12 | 26.6 |

It can be seen from the above table that a hydroxy compound may be used as a charring agent in this disclosure, and the effect of trisphenol was particularly notable.

Example 10

The Comparison in the Case where Phosphoric Acid was Used as a Phosphorization Agent:

In a 250-milliliter beaker, 10 grams of phosphoric acid were added, then 8 grams of a foaming agent (melamine) were added in batches, followed by uniform stirring. An appropriate amount of water was added to initiate reaction, and sufficient reaction was allowed. 6 grams of a charring agent (cellulose) and a polyol crosslinking agent were further added for further reaction. After the reaction was complete, the product was cooled to room temperature. An amine such as an aqueous methylamine solution was then added at 15-40° C. for neutralization until pH was 5-8, and subsequently filtration was performed and filter residue was dried. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:
  flame retarding time of 7.5 minutes (big panel method);
  flame propagation rate of 47% (tunnel method);
  carbonization volume, weight loss of 12.5 grams (cabinet method);
  paint strip limiting oxygen index (OI) of 25.1%.

Example 11

Following the same method as Example 10, but different phosphorization agents (8-14 grams) as shown in Table 5 were used, and the obtained results were given in Table 5.

TABLE 5

Experimental data obtained by using the same method but different phosphorization agents

| Phosphorization agent | Flame retarding time (minute) | Flame propagation rate | Combustion weight loss (gram) | Paint strip limiting oxygen index | Yield |
|---|---|---|---|---|---|
| Polyphosphoric acid | 10 | 38% | 9 | 30.1 | 82% |
| Pyrophosphoric acid | 14 | 31% | 8.0 | 35.0 | 67% |
| Phosphoric acid | 7.5 | 47% | 12.5 | 25.1 | 74% |
| Phosphorus pentaoxide | 11 | 35% | 8.5 | 31.0 | 45% |

It can be seen from the above table that a phosphoric acid compound may be used as a phosphorization agent in this disclosure, and the effect of polyphosphoric acid was particularly notable.

Example 12

The Comparison in the Case where an Aqueous Sodium Hydroxide Solution was Used as an Alkali for Neutralization:

In a 250-milliliter beaker, 10 grams of phosphoric acid were added, then 8 grams of a foaming agent (melamine) were added in batches, followed by uniform stirring. An appropriate amount of water was added to initiate reaction, and sufficient reaction was allowed. 6 grams of a charring agent (cellulose) and a polyol crosslinking agent were further added for further reaction. After the reaction was complete, the product was cooled to room temperature. An aqueous sodium hydroxide solution was then added at 15-40° C. for neutralization until pH was 5-8, and subsequently filtration was performed and filter residue was dried. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:
  flame retarding time of 8 minutes (big panel method);
  flame propagation rate of 45% (tunnel method);
  carbonization volume, weight loss of 11.5 grams (cabinet method);
  paint strip limiting oxygen index (OI) of 26.5%.

Example 13

Following the same method as Example 12, but different alkalis (usage amounts of 5-14 grams) as shown in Table 6 were used for neutralization to neutral pH, and the obtained results were shown in Table 6.

TABLE 6

Experimental data obtained by using the same method but different alkalis for neutralization

| Alkali | Flame retarding time (minute) | Flame propagation rate | Combustion weight loss (gram) | Paint strip limiting oxygen index | Yield |
|---|---|---|---|---|---|
| Methylamine | 10 | 38% | 9 | 30.1 | 86% |
| Triethylamine | 8 | 45% | 11 | 28.1 | 85% |
| Aniline | 7 | 50% | 13 | 25.1 | 63% |
| Aqueous ammonia | 9 | 41% | 10 | 28.5 | 78% |

It can be seen from the above table that an amine compound may be used for neutralization, and the effect of methylamine was particularly notable.

Example 14

The Comparison Between Neutralizations to pH=3 and to pH=10:

In a 250-milliliter beaker, 10 grams of phosphoric acid were added, then 8 grams of a foaming agent (melamine) were added in batches, followed by uniform stirring. An appropriate amount of water was added to initiate reaction, and sufficient reaction was allowed. 6 grams of a charring agent (cellulose) and a polyol crosslinking agent were further added for further reaction. After the reaction was complete, the product was cooled to room temperature. An amine such as an aqueous methylamine solution was then added at a temperature of 15-40° C. for neutralization until pH=3 or pH=10. In neutralization to pH=3, a small amount of relatively viscous solid was obtained. This solid has relatively great damage to mechanical and physical properties of base material and is not suitable as a flame retardant main body. In neutralization to pH=10, a solid was obtained. The resultant solid, melamine phosphate, and pentaerythritol were mixed at a ratio of (1-3:0.5-1.5:0.2-1.2) and were uniformly pulverized to obtain a solid powder. 6 grams of this solid powder were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:

flame retarding time of 10 minutes (big panel method);
flame propagation rate of 40% (tunnel method);
carbonization volume, weight loss of 10 grams (cabinet method);
paint strip limiting oxygen index (OI) of 28.8%.

Example 15

The pH values after neutralizations in Example 14 were changed to the values in Table 7, and the obtained results were shown in Table 7.

TABLE 7

Experimental data from neutralizations to different pHs

| pH value | Flame retarding time (minute) | Flame propagation rate | Combustion weight loss (gram) | Paint strip limiting oxygen index | Yield |
|---|---|---|---|---|---|
| 3 | 10 | 38% | 9 | 30.5 | 36% |
| 5-8 | 10 | 38% | 9 | 29.4 | 85% |
| 10 | 10 | 40% | 10 | 28.8 | 80% |

It can be seen from the above table that the flame-retardant effect and the reaction yield reached an optimal balance effect when pH is in a range of 5-8.

Example 16

The Comparison of Large-Particle Flame Retardants:

The solid obtained in Example 1 was pulverized to a size of 50 micrometers or more, 6 grams of which were added to 20 grams of a polyurethane paint, followed by uniform mixing. By means of GB12441-2005, a national standard for fireproof coatings (there was no standard for flame-retardant paints at present), the properties of the flame-retardant paint after being coated onto a wood five-ply board base material were as follows:

flame retarding time of 7.5 minutes (big panel method);
flame propagation rate of 49% (tunnel method);
carbonization volume, weight loss of 12.0 g (cabinet method);
paint strip limiting oxygen index (OI) of 25.6%.

TABLE 8

| Particle size (micrometer) | Flame retarding time (minute) | Flame propagation rate | Combustion weight loss (gram) | Paint strip limiting oxygen index |
|---|---|---|---|---|
| 5-20 | 10 | 38% | 9 | 30.1 |
| 50 | 7.5 | 49% | 12 | 25.6 |

It can be seen from Table 8 that large-particle flame retardants resulted in the reduction of mechanical and physical properties of paints. For example, when the paint was apparently dried, the gloss was substantially lost and the adherence was reduced.

Example 17

In a 250-milliliter small-size ceramic reaction tank, 10 grams of pyrophosphoric acid were added, then 8 grams of melamine phosphate were added in batches, followed by uniform stirring. An appropriate amount of water was used to initiate reaction, and sufficient reaction was allowed. 6 grams of a charring agent (starch) were further added to continue the reaction. A crosslinking agent (aminopropanol) and a charring agent (pentaerythritol) were subsequently added. After the reaction was complete, the product was cooled to room temperature. An amine was further added for neutralization until pH was 5-8. This turbid liquid was filtered and the obtained filter residue was dried. The resultant solid, a first nitrogen-containing foaming agent, and a first charring agent were uniformly mixed at a ratio of (1-3:0.5-1.5:0.2-1.2) and were pulverized, and a phosphorus-nitrogen-based intumescent paint flame retardant was obtained.

7 grams of this flame retardant were added to 20 grams of an epoxy resin paint, followed by uniform mixing, and they were coated onto a wood base material board. By means of GB12441-2005, a national standard for fireproof coatings (there was no standard for flame-retardant paints at present), the detected properties of the flame-retardant paint were as follows:

flame retarding time of 14 minutes (big panel method);
flame propagation rate of 31% (tunnel method);
carbonization volume, weight loss of 8.0 g (cabinet method);
paint strip limiting oxygen index (OI) of 35%.

The mechanical and physical properties reached the standards of GB/T23997-2009 and GB18581-2009.

Example 18

The Comparison in the Case of No First Charring Agent:

The flame retardant main body obtained in Example 10 and a first nitrogen-containing foaming agent were uniformly mixed at a ratio of 1:1 and were pulverized, and thus a phosphorus-nitrogen-based intumescent paint flame retardant without first charring agent was obtained.

7 grams of this flame retardant were added to 20 grams of an epoxy resin paint, followed by uniform mixing, and they were coated onto a wood base material board. By means of GB12441-2005, a national standard for fireproof coatings (there was no standard for flame-retardant paints at present), the detected properties of the flame-retardant paint were as follows:
  flame retarding time of 9 minutes (big panel method);
  flame propagation rate of 41% (tunnel method);
  carbonization volume, weight loss of 9.5 grams (cabinet method);
  paint strip limiting oxygen index (OI) of 27.8%.

Example 19

The Comparison in the Case of No First Foaming Agent:
The flame retardant main body obtained in Example 10 and a first charring agent were uniformly mixed at a ratio of 1:2 and were pulverized, and thus a phosphorus-nitrogen-based intumescent paint flame retardant without first foaming agent was obtained.

7 grams of this flame retardant were added to 20 grams of an epoxy resin paint, followed by uniform mixing, and they were coated onto a wood base material board. By means of GB12441-2005, a national standard for fireproof coatings (there was no standard for flame-retardant paints at present), the detected properties of the flame-retardant paint were as follows:
  flame retarding time of 8.5 minutes (big panel method);
  flame propagation rate of 42% (tunnel method);
  carbonization volume, weight loss of 10 g (cabinet method);
  paint strip limiting oxygen index (OI) of 27.1%.

Example 20

The Application in Alkyd Paints:
7 grams of the phosphorus-nitrogen-based intumescent paint flame retardant prepared in Example 10 were added to an alkyd paint, followed by uniform mixing, and they were coated onto a wood three-ply board base material. By means of GB12441-2005, a national standard for fireproof coatings (there was no standard for flame-retardant paints at present), the detected properties of the flame-retardant paint were as follows:
  flame retarding time of 11 minutes (big panel method);
  flame propagation rate of 36% (tunnel method);
  carbonization volume, weight loss of 8.5 grams (cabinet method);
  limiting oxygen index (OI) of 30%.
The mechanical and physical properties reached the standards of GB/T23997-2009 and GB18581-2009.

Example 21

The ratio of flame retardant main body:first foaming agent:first charring agent (the mass of the main body is 10 grams) was changed as shown in Table 9, and the obtained results were shown in Table 9.

TABLE 9

Experimental data from different ratios of flame retardant main body:first foaming agent:first charring agent

| Flame retardant main body:first foaming agent:first charring agent (weight ratio) | Flame retarding time (minute) | Flame propagation rate | Combustion weight loss (gram) | Paint strip limiting oxygen index |
|---|---|---|---|---|
| 1:0.5:0.2 | 7 | 50% | 13 | 25 |
| 2:1:0.5 | 8 | 45% | 12 | 27.5 |
| 3:1:0.5 | 8.5 | 41% | 11 | 28.3 |
| 2:1.5:1 | 8 | 45% | 12 | 27.2 |
| 1:0.5:1.2 | 6.5 | 55% | 14 | 24.1 |
| 2:1:1.2 | 9 | 39% | 10 | 29.3 |
| 3:1:1.2 | 10 | 35% | 9 | 30.0 |

It can be seen from Table 9 that the best limiting oxygen index was provided when the ratio of flame retardant main body:first foaming agent:first charring agent (weight ratio) was 3:1:1.2.

Example 22

Wood boards of 90×190×20 mm and 190×1000×20 mm were placed in a flame retardant, soaked under boiling condition for 10 minutes, and then were withdrawn to be air-dried or oven-dried. Measurement was then performed according to standard GB 8624-88. Test pieces had an average value of remaining length>150 mm and an average smoke temperature<200° C. Additionally, the wood board strip after this treatment had a limiting oxygen index (OI)>40%. The wood board treated with this flame retardant was a fire retardant building material.

Example 23

Cotton fabrics were placed in a flame retardant and soaked at normal temperature for 10 minutes, and then were withdrawn to be air-dried or oven-dried. Measurement was then performed according to standard GB8624-2006. A test pieces was subjected to a vertical combustion test, and had an average after-flame time of 0 second, an average afterglow time of 0 second, an average damaged length of 105 mm, and a limiting oxygen index (OI) of 37.5%.

Those described above are only preferable specific embodiments of this invention, and the scope of this invention is not limited thereto. Within the technical scope disclosed by this application, any person skilled in the art will easily conceive variations or replacements, which should be covered by the scope of this invention. Therefore, the protection scope of this invention should be determined by the scope described in the claims.

What is claimed is:
1. A phosphorus-nitrogen-based intumescent flame retardant, comprising a first nitrogen-containing foaming agent, a first charring agent, and a flame retardant main body, the flame retardant main body being a product of a reaction between a phosphorization agent, a second nitrogen-containing foaming agent, a second charring agent, and a hydroxy-containing polyfuctional crosslinking agent, wherein
  said first nitrogen-containing foaming agent and said second nitrogen-containing foaming agent are each independently selected from the group consisting of ammonium hydrogen carbonate, melamine, polyphosphamide, urea, semicarbazide, a hydrazine compound, a guanidine compound, and an azo compound;
  said first charring agent and said second charring agent are each independently selected from the group con- sisting of an amylose, a pullulan, a cyclodextrin, a saccharide compound, and a polyol amine compound;

said phosphorization agent is red phosphorus, phosphorus pentaoxide, phosphoric acid, pyrophosphoric acid, polyphosphoric acid, phosphamide, polyphosphamide, or phosphorus oxychloride; and said hydroxy-containing polyfunctional crosslinking agent is ethylene glycol, glycerol, pentaerythritol, phloroglucinol, hydroquinone, aminoethanol, aminopropanol, or an alcoholamine compound.

2. The phosphorus-nitrogen-based intumescent flame retardant according to claim 1, wherein the ratio of said flame retardant main body to said first nitrogen-containing foaming agent to said first charring agent is 1-3:0.5-1.5:0.2-1.2.

3. The phosphorus-nitrogen-based intumescent flame retardant according to claim 1, wherein the weight ratio of said phosphorization agent to said second nitrogen-containing foaming agent is 1:0.5 to 1:4.0, the weight ratio of said phosphorization agent to said second charring agent is 1:0.5 to 1:3.0, the weight ratio of said phosphorization agent to said hydroxy-containing polyfuctional crosslinking agent is 1:0.5 to 1:4.0, the particle size of said flame retardant is 0.4-20.0 micrometers, the phosphorus content of said flame retardant is 8-23%, and/or the nitrogen content of said flame retardant is 10-34%.

4. A method of preparing the phosphorus-nitrogen-based intumescent flame retardant according to claim 1, comprising the following steps:

a) a flame retardant main body preparing step, wherein a phosphorization agent, a second nitrogen-containing foaming agent, a second charring agent, and a hydroxy-containing polyfuctional crosslinking agent are reacted to obtain a reaction system containing a flame retardant main body;

b) a filtering step, wherein the solid in the reaction system is filtered off to obtain a flame retardant main body; and c) a mixing step, wherein said flame retardant main body is mixed with a first nitrogen-containing foaming agent and a first charring agent.

5. The method of preparing a phosphorus-nitrogen-based intumescent flame retardant according to claim 4, wherein, in said flame retardant main body preparing step, said phosphorization agent and said second nitrogen-containing foaming agent are first reacted in the presence of an initiator, and then said second charring agent and said hydroxy-containing polyfuctional crosslinking agent are added.

6. A flame-retardant paint, comprising a paint body and the phosphorus-nitrogen-based intumescent flame retardant according to claim 1.

7. Use of the phosphorus-nitrogen-based intumescent flame retardant according to claim 1 in the flame retarding of wood, cotton cloth, and paper.

8. A flame-retardant wood, a flame-retardant cotton cloth, or a flame-retardant paper, containing the phosphorus-nitrogen-based intumescent flame retardant according to claim 1.

9. A flame-retardant paint, comprising a paint body and the phosphorus-nitrogen-based intumescent flame retardant according to claim 2.

10. A flame-retardant paint, comprising a paint body and the phosphorus-nitrogen-based intumescent flame retardant according to claim 3.

11. A flame-retardant wood, a flame-retardant cotton cloth, or a flame-retardant paper, containing the phosphorus-nitrogen-based intumescent flame retardant according to claim 2.

12. A flame-retardant wood, a flame-retardant cotton cloth, or a flame-retardant paper, containing the phosphorus-nitrogen-based intumescent flame retardant according to claim 3.

* * * * *